(12) United States Patent
Yamaoka et al.

(10) Patent No.: US 9,888,627 B2
(45) Date of Patent: Feb. 13, 2018

(54) LAWNCARE APPARATUS WITH A FOLDABLE OPERATING ARM

(71) Applicant: Chervon (HK) Limited, Wanchai (HK)

(72) Inventors: Toshinari Yamaoka, Nanjing (CN); Fangjie Nie, Nanjing (CN); Haishen Xu, Nanjing (CN); Xiandian Shao, Nanjing (CN)

(73) Assignee: Chervon (HK) Limited, Wanchai (HK)

( * ) Notice: Subject to any disclaimer, the term of this patent is extended or adjusted under 35 U.S.C. 154(b) by 256 days.

(21) Appl. No.: 14/048,158

(22) Filed: Oct. 8, 2013

(65) Prior Publication Data

US 2014/0102064 A1    Apr. 17, 2014

(30) Foreign Application Priority Data

Oct. 15, 2012   (CN) .......................... 2012 1 0387914
May 3, 2013    (CN) ..................... 2012 2 0602040 U

(51) Int. Cl.
   *A01D 75/28*        (2006.01)
   *A01D 34/82*        (2006.01)
   (Continued)

(52) U.S. Cl.
   CPC ......... *A01D 34/828* (2013.01); *A01D 34/006* (2013.01); *A01D 34/68* (2013.01);
   (Continued)

(58) Field of Classification Search
   CPC .... A01D 34/824; A01D 34/828; A01D 34/68; A01D 75/006; A01D 34/6806; A01D 34/006; A01D 2101/00
   (Continued)

(56) References Cited

U.S. PATENT DOCUMENTS

D158,847 S  *   6/1950  Flanigan .................... D15/16
2,727,753 A  *  12/1955  Johnson ............... A01D 34/824
                                                                16/437
(Continued)

FOREIGN PATENT DOCUMENTS

CN        201821663        5/2011
EP       0903074 A1        3/1999
EP      1543711 A2  *      6/2005    ........... A01D 34/001

OTHER PUBLICATIONS

Canadian Intellectual Property Office, Office Action and Examination Search Report issued on CA Appl. No. 2,829,898, dated Jan. 27, 2015, 4 pgs.

*Primary Examiner* — Thomas B Will
*Assistant Examiner* — Joan D Misa
(74) *Attorney, Agent, or Firm* — Greenberg Traurig, LLP

(57) ABSTRACT

A lawncare apparatus includes a main body, multiple wheels supporting the main body, a cutting blade disposed in the main body, a motor driving the cutting blade, and an operating arm connected to the first end of the main body. The distance in the horizontal direction between the axial central line of the cylindrical gripping portion of the operating arm and the axes of the elongated handle of the main body along the length direction is less than 5 cm. Because of the structure mate relationship between the operating arm and the cylindrical gripping portion, the operator feels more comfortable during the transporting process, the volume of lawncare apparatus during transporting is reduced and the convenience of transporting is improved.

10 Claims, 5 Drawing Sheets

(51) Int. Cl.
*A01D 34/68* (2006.01)
*A01D 75/00* (2006.01)
*A01D 34/00* (2006.01)
*A01D 101/00* (2006.01)

(52) U.S. Cl.
CPC ....... *A01D 34/6806* (2013.01); *A01D 34/824* (2013.01); *A01D 75/006* (2013.01); *A01D 2101/00* (2013.01)

(58) Field of Classification Search
USPC ........................ 56/10.5, 16.7, 17.5
See application file for complete search history.

(56) References Cited

U.S. PATENT DOCUMENTS

| | | | | | |
|---|---|---|---|---|---|
| 3,038,737 | A * | 6/1962 | Lill | .............. | A01D 34/824 280/655.1 |
| 3,357,716 | A * | 12/1967 | Musichuk | ........... | A01D 34/824 16/437 |
| 3,423,103 | A * | 1/1969 | Maltarp | ............... | A01D 34/824 16/437 |
| 3,462,924 | A * | 8/1969 | Erickson | .............. | A01D 34/824 16/437 |
| 3,485,017 | A * | 12/1969 | Beares | ............... | A01D 34/824 16/437 |
| 3,527,469 | A * | 9/1970 | Gobin | .................. | A01D 34/824 16/438 |
| 3,534,432 | A * | 10/1970 | Davies | ................ | A01D 34/824 16/437 |
| 3,855,763 | A * | 12/1974 | Seifert | ................... | A01D 34/63 16/437 |
| 4,003,190 | A * | 1/1977 | Braun | ................ | A01D 34/6806 123/185.2 |
| 4,870,811 | A * | 10/1989 | Steele | ................ | A01D 34/001 56/10.5 |
| 4,981,011 | A * | 1/1991 | Olejak | ............... | A01D 43/0631 56/10.2 R |
| 5,138,824 | A * | 8/1992 | Oshima | .............. | A01D 34/6806 56/10.2 R |
| 5,163,275 | A * | 11/1992 | Hare | .................... | A01D 34/824 280/47.36 |
| 5,209,051 | A * | 5/1993 | Langdon | ................ | A01D 34/81 16/437 |
| 5,261,215 | A * | 11/1993 | Hartz | ..................... | A01D 34/81 16/437 |
| 5,606,851 | A * | 3/1997 | Bruener | ............ | A01D 34/6806 56/10.8 |
| 5,636,504 | A * | 6/1997 | Kaley | .................. | A01D 34/001 16/437 |
| 6,404,078 | B1 * | 6/2002 | Thomas | ................... | H01H 9/06 200/541 |
| 6,644,002 | B2 * | 11/2003 | Trefz | ................ | A01D 34/6806 56/10.8 |
| 6,708,473 | B2 * | 3/2004 | Nicolay | ............... | A01D 34/824 56/16.7 |
| 7,591,126 | B2 * | 9/2009 | Cox | ..................... | A01D 34/824 56/10.8 |
| 7,707,812 | B2 * | 5/2010 | Cheung | .................. | A01D 34/68 56/15.8 |
| 8,316,510 | B2 * | 11/2012 | Anraku | ............... | A01D 34/824 16/437 |
| 8,359,821 | B2 * | 1/2013 | Park | ..................... | A01D 34/824 56/17.1 |
| 8,713,761 | B2 * | 5/2014 | Grewe | ................... | B62B 5/064 16/437 |
| 2006/0075732 | A1 * | 4/2006 | Nottingham | ......... | A01D 34/416 56/12.7 |
| 2011/0088362 | A1 * | 4/2011 | Rosa | ...................... | A01D 34/69 56/11.9 |
| 2011/0126502 | A1 * | 6/2011 | Pitman | ................... | A01D 34/68 56/10.8 |
| 2013/0111866 | A1 * | 5/2013 | Schmalz | ................ | A01D 34/82 56/17.5 |
| 2013/0212996 | A1 * | 8/2013 | Shao | ........................ | B25G 3/38 56/16.7 |
| 2014/0196425 | A1 * | 7/2014 | Lewis | .................. | H02J 7/0068 56/16.7 |

* cited by examiner

US 9,888,627 B2

LAWNCARE APPARATUS WITH A FOLDABLE OPERATING ARM

RELATED APPLICATION INFORMATION

This application claims the benefit of CN 201210387914.9, filed on Oct. 15, 2012, and CN 201220602040.X, filed on May 3, 2013, the disclosures of which are incorporated herein by reference in their entirety.

FIELD OF THE DISCLOSURE

The subject disclosure relates to garden tools and, more particularly, to a lawncare apparatus.

BACKGROUND

A commonly used lawncare apparatus, such as a walk-behind lawnmower, includes a cutting device, a deck supporting the cutting device, a chassis having four wheels to which the deck is mounted, and a handle for pushing a main body of the lawncare apparatus disposed at one end of the chassis.

When using the lawnmower, there are two ways to transport the lawnmower from a storage room to a lawn. The first way is to place the four wheels on the ground and push/pull the lawnmower. The second way is to lift the lawnmower away from the ground. The first way requires a large storage room and the second way requires that the lawnmower is of light weight. That is, the way to transport the lawnmower from the storage room to the lawn needs to be improved.

SUMMARY

The following will describe a lawncare apparatus which can improve operating comfort of the operator, reduce volume of the lawncare apparatus during transporting and/or storage, and further improve convenience of transporting.

To achieve the above object, a described lawncare apparatus includes a main body, a plurality of wheels supporting the main body, a cutting blade disposed in the main body, a motor driving the cutting blade, and an operating arm connected to the first end of the main body, wherein an elongated handle is disposed on the second end of the main body which is away from the operating arm. The operating arm includes a cylindrical gripping portion and the operating arm can be folded to a folded position. When the operating arm is at the folded position and the multiple wheels contacts the level surface, the distance in the horizontal direction between the axial central line of the cylindrical gripping portion and the axes of the elongated handle along the length direction is less than 5 cm.

To achieve the above object, another described lawncare apparatus includes a main body, a plurality of wheels supporting the main body, a cutting blade disposed in the main body, a motor driving the cutting blade, an operating arm connected to a first end of the main body, and an elongated handle positioned on a second end of the main body which is away from the operating arm. The operating arm is capable of being folded to a folded position and the internal profile of the operating arm is mated with the external profile of the elongated handle such that the operating arm at the folded position is clearance fitted with the elongated handle.

The lawncare apparatus of the invention can be pulled obliquely. Further, because of the structure mate relationship between the operating arm and the cylindrical gripping portion, the operator will feel more comfortable during the transporting process and the volume of the lawncare apparatus during transporting is reduced, and further, the convenience of transporting is improved.

DETAILED DESCRIPTION OF PREFERRED EMBODIMENTS

The invention will be described below in details with reference to the drawings and preferred embodiments thereof.

Figure 1:
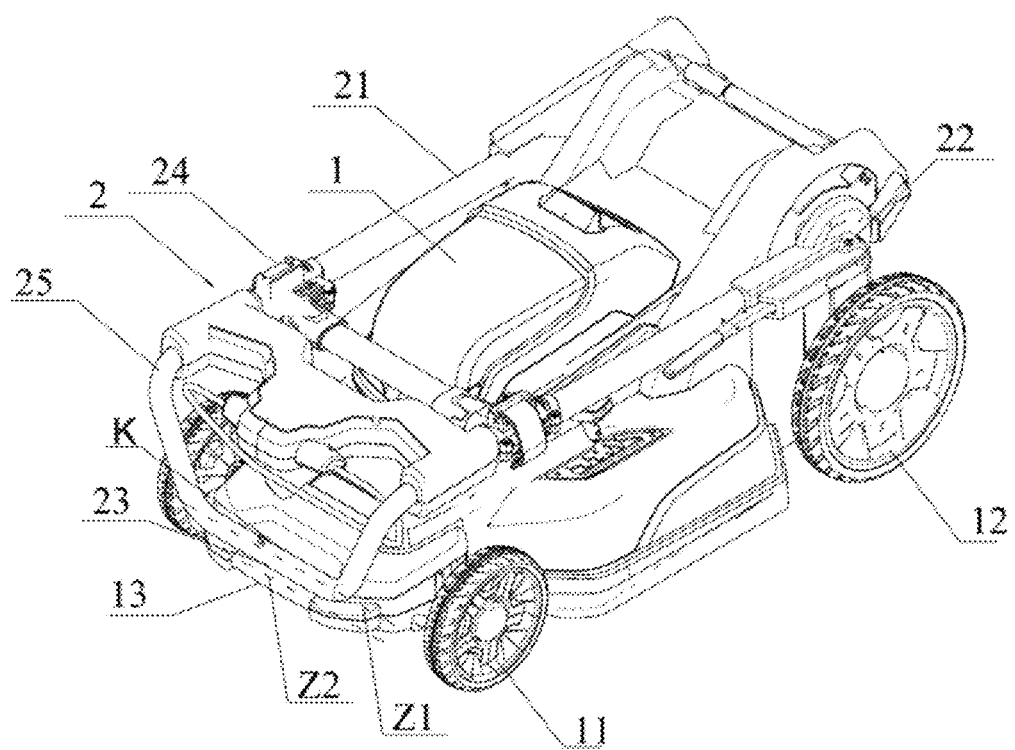
FIG. 1 is a schematic, isometric view showing an exemplary lawncare apparatus constructed according to the description which follows wherein an operating arm is folded.
Figure 2:
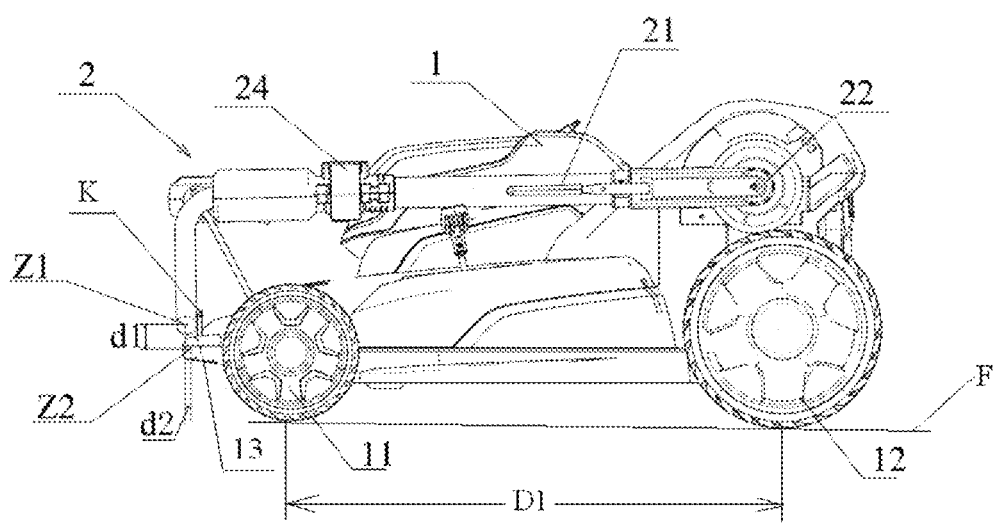
FIG. 2 is a side schematic view showing the exemplary lawncare apparatus of FIG. 1.

Referring to FIG. 1 and FIG. 2, in the illustrated embodiment, the lawncare apparatus is a hand push lawnmower. The lawncare apparatus includes a main body 1, a first pair of wheels 11 and a second pair of wheels 12 supporting the main body 1, a cutting blade disposed in the main body 1, a motor driving the cutting blade, and an operating arm 2 connected to the first end (rear end) of the main body 1. The first pair of wheels 11 and the second pair of wheels 12 are disposed respectively at the second end (front end) and the first end (rear end) of the main body 1. The operating arm 2 is pivotally connected to the rear end of the main body 1 by a pivot shaft 22 and positioned above the second pair of wheels 12. The front end of the main body 1, which is away from the operating arm 2, includes an elongated handle 13. In the illustrated embodiment the elongated handle 13 is substantially cylinder-shaped and includes an axis Z2 along the longitude direction. The operating arm 2 includes a cylindrical gripping portion 23 and can be folded to a folded position, and the cylindrical gripping portion 23 includes an axial central line Z1.

When the operating arm is at the folded position and the first pair of wheels 11 and the second pair of wheels 12 both contact the horizontal surface F, if the gripping portion 23 is above the handle 13, the distance d1 in the vertical direction between the axial central line Z1 and the axis Z2 along the longitude direction is greater than the sum of the radius of the gripping portion 23 and the radius of the cylinder-shaped handle 13, and the distance d1 is less than 5 cm. For example, the diameters of the gripping portion 23 and the cylinder-shaped handle 13 are both 1.5 cm, then the distance d1 is at least greater than 1.5 cm. Preferably, the distance d1 is 3 cm, and a distance d2 in the horizontal direction between the axial central line Z1 and the axis Z2 is also less than 5 cm, and in the illustrated embodiment, the distance d2 is preferably 0.5 cm. Therefore, when the operating arm 2 is at the folded position, the user can grip both the gripping portion 23 and the cylinder-shaped handle 13 conveniently.

Additionally, in an alternative embodiment, to allow the user to grip both the gripping portion 23 and the cylinder-shaped handle 13 more conveniently, the internal profile of the gripping portion 23 is mated with the external profile of the cylinder-shaped handle 13, such that when the operation arm 2 is at the folded position, the outer surface of the gripping portion 23 and the cylinder-shaped handle 13 contact with each other. At this time, the gripping portion 23 and the cylinder-shaped handle 13 can lie in a horizontal plane, the distance d2 in the horizontal direction between the axial central line Z1 and the axis Z2 is larger than the sum of the radius of the gripping portion 23 and the radius of the cylinder-shaped handle 13, and the distance d1 is zero. It should be noted that the external profile of the gripping portion 23 may be designed to mate with the internal profile of the cylinder-shaped handle 13.

To allow the user to grip both the gripping portion 23 and the cylinder-shaped handle 13 more stably, a clip K is disposed on the handle 13. When the operation arm is at the folded position, the clip K is engaged with the cylindrical gripping portion 23.

Further, in the illustrated embodiment, the operating arm 2 is extendable, and a safety switch assembly 240 is disposed in the operating arm 2, the operating arm 2 includes an inner pipe 25 and an outer pipe 21, the outer pipe 21 is rotatably connected to the rear end of the main body 1 by the pivot shaft 22, and the end of the outer pipe 21 includes a pipe sleeve 24.

Figure 3:
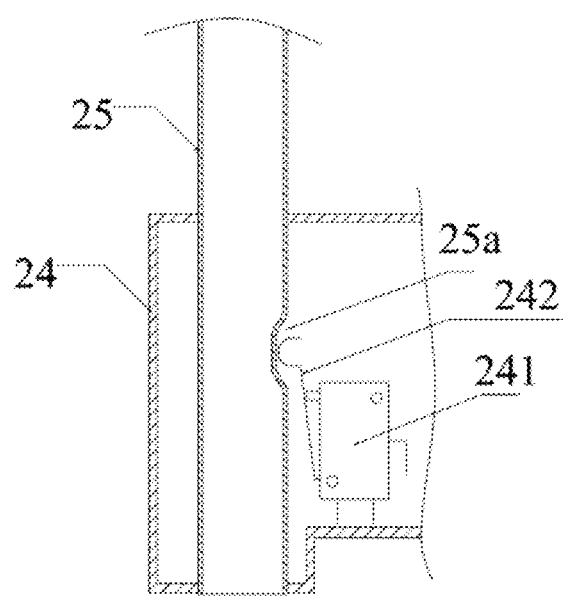
FIG. 3 is a schematic view showing an exemplary safety switch assembly of the lawncare apparatus of FIG. 1.

Referring to FIG. 3, the safety switch assembly 240 is disposed in the sleeve pipe 24 and a safety shift structure 25a is disposed in the inner pipe 25. The safety switch assembly 240 includes a safety switch 241 and a trigger assembly 242 configured to trigger the safety switch 241 when the safety shift structure 25a of the inner pipe 25 is disengaged from a safety location and reset the safety switch 241 when the safety shift structure 25a returns to the safety location. The safety switch 241 is electrically connected to a control circuit for controlling the motor in the main body 1.

In the embodiment, the trigger assembly 242 is a contacting spring sheet. One end of the contacting spring sheet is connected to the safety switch 241 and the other end is a free end. When the inner pipe 25 slides, the wall of the inner pipe 25 presses the contacting spring sheet to trigger the safety switch 241. The contacting spring sheet 242 is formed with elasticity. When the inner pipe 25 slides, the safety shift structure 25a moves back to the safe position and, at this time, the safety shift structure 25a is within a receiving groove configured to accommodate the contacting spring sheet, and the contacting spring sheet 242 is out of outer force and will not trigger the safety switch 241.

When the inner pipe 25 is retracted into the outer pipe 21, the safety shift structure 25a leaves the safe position and the wall of the inner pipe 25 presses the contacting spring sheet 242 to trigger the safety switch. At this time, even during the transporting process, if the user operates the operating switch by mistake, the motor cannot be started, which can reduce the possibility of danger happening to the user.

Figure 4:
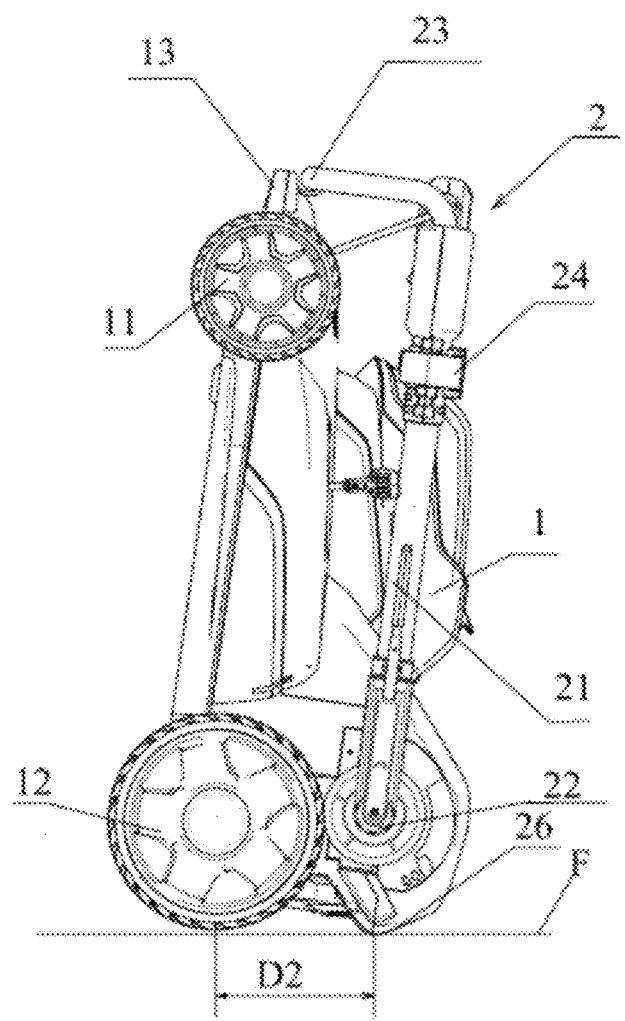
FIG. 4 is a side schematic view showing the lawncare apparatus of FIG. 1 in a storage position.

Additionally, referring to FIG. 2 again, when the lawnmower is at the using position, the first pair wheels 11 and the second pair wheels 12 are supported on the supporting surface F. If light is shining from a direction perpendicular to the supporting surface F, the main body 1 of the lawnmower projects a first orthographic projection on the supporting surface F. Referring to FIG. 4, the lawnmower is at the storage position. When the lawnmower is stored, the lawnmower stands uprightly for storing in a storage room and the operating arm 2 is folded and only the second wheels 2 are supported on the supporting surface F. For improving stability, a supporting portion 26 is disposed on the main body 1 for supporting on the supporting surface F, and the supporting portion can be integrated with or separated from the main body 1. In the same way, at this time if light is shining from a direction perpendicular to the supporting surface F, the main body 1 of the lawnmower projects a second orthographic projection on the supporting surface F. Since the width of the lawnmower at the using position is the same as that of the lawnmower at the storage position, and the distance D1 between the first pair wheels 11 and the second pair wheels 12 is larger than the distance D2 between the first pair of wheels 11 and the supporting portion 26, the first orthographic projection area of the lawnmower at the using position is larger than the second orthographic projection area of the lawnmower at the storage position.

Figure 5:
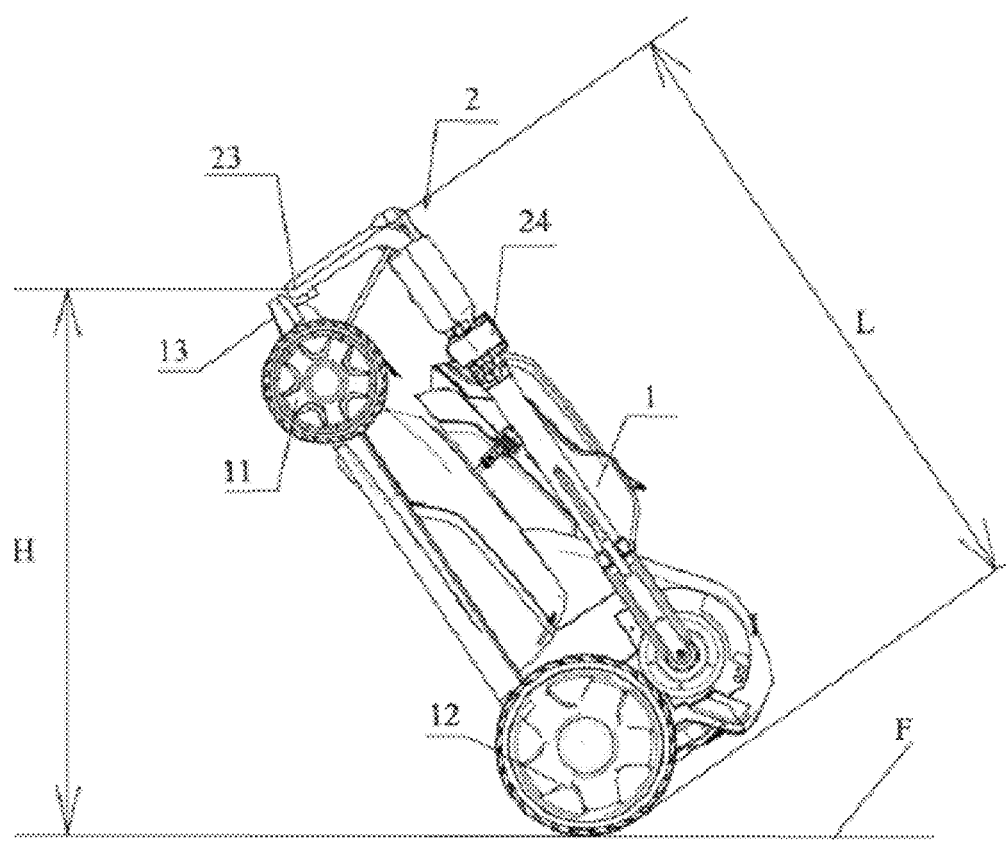
FIG. 5 is a side schematic view showing the lawncare apparatus of FIG. 1 in an obliquely disposed, pulling position.

Referring to FIG. 5, when the lawnmower is changed from the using position to the obliquely pulled position, only the second pair wheels 12 contact the supporting surface and the hands of the user grip a pull portion which is preferably the cylindrical gripping portion 23. At this time, the operating arm 2 is at the folded position, the distance of the gripping portion 23 relative to the supporting surface F is H; the distance of the gripping portion 23 relative to the point the second pairs wheels 12 contacting the supporting surface F is L, and the ratio of H to L may be 0.5~1, preferably 0.8~0.9, for meeting the needs of ergonomics. Therefore, when pulling the lawnmower, only part of the weight of the lawnmower is supported by the user, which makes the user feel more labor-saving.

From the above, the described lawncare apparatus can be pulled obliquely, and because of the structure mate relationship between the operating arm and the cylindrical gripping portion, the user can feel more comfortable during transporting and the pulling process is more stable, so that the volume of the lawncare apparatus during transporting is reduced and the operability of lawnmower pulling is improved. Since a safety switch mechanism is disposed on the operating arm, misoperation of the lawncare apparatus can be avoided and safety of pulling is improved.

The general principle, primary features and advantages of the invention have been illustrated and described above. Those skilled in the art will appreciate that the foregoing embodiments are not intended to limit the invention in any form and technical implementations derived with equal substitutions or equivalent variations shall be considered as falling within the scope of the claimed invention.

What is claimed is:

1. A lawncare apparatus, comprising:
   a main body;
   a pair of front wheels and a pair or rear wheels supporting the main body;
   a cutting blade disposed in the main body;
   a motor driving the cutting blade;
   an operating arm connected to a first end of the main body; and
   an elongated handle positioned on a second end of the main body which is away from the operating arm, wherein the operating arm includes a substantially cylindrical gripping portion and the operating arm is capable of being folded to a folded position such that, when the operating arm is at the folded position and the front and rear wheels contacts the level surface, the distance in the horizontal direction between the axial central line of the cylindrical gripping portion and the axis of the elongated handle along the longitude direction is less than 5 cm, and
   wherein the gripping portion of the operating arm is located at least partially in front of the front wheel as viewed in a lateral direction, wherein the distance in the vertical direction between the axial central line of the cylindrical gripping portion and the axis of the elongated handle along the length is less than 5 cm;

wherein the operating arm comprises an inner pipe and an outer pipe which are capable of sliding relative to each other and the outer pipe is rotatably connected to a first end of the main body, a pipe sleeve is disposed on an end of the outer pipe distal from the main body, and a safety switch assembly is mounted in the pipe sleeve, the inner pipe comprises a safety shift structure, and the safety switch assembly includes a safety switch and a trigger assembly configured to trigger the safety switch when the inner pipe is slidingly moved relative to the outer pipe such that the safety shift structure of the inner pipe is operably disengaged from the trigger assembly, and reset the safety switch when the inner pipe is slidingly moved relative to the outer pipe such that the safety shift structure operably engages the trigger assembly, and the safety switch is electrically connected to a control circuit for controlling the motor in the main body, such that the motor is inoperable when the safety shift structure of the inner pipe is operably disengaged from the trigger assembly and such that the motor is operable when the safety shift structure of the inner pipe is operably engaged with the trigger assembly.

2. The lawncare apparatus according to claim 1, wherein the elongated handle further comprises a clip, and when the operating arm is at the folded position, the clip is engaged with the cylindrical gripping portion.

3. The lawncare apparatus according to claim 1, wherein the operating arm is extendable.

4. The lawncare apparatus according to claim 1, wherein the safety shift structure is a receiving groove configured to accommodate the trigger assembly and which is disposed on a side of the inner pipe facing the trigger assembly.

5. The lawncare apparatus according to claim 1, wherein the lawncare apparatus includes an obliquely oriented pulling position where wheels disposed at a first end of the main body are supported on a supporting surface and a vertical distance between the cylindrical gripping portion and the supporting surface and an inclined distance between the cylindrical gripping portion and a point at which the wheels contact the support surface has a ratio in a range from 0.5 to 1.

6. A lawncare apparatus, comprising:
a main body;
a plurality of wheels supporting the main body;
a cutting blade disposed in the main body;
a motor driving the cutting blade;
an operating arm connected to a first end of the main body;
an elongated handle extending from a second end of the main body; and
a gripping portion extending substantially perpendicular from the operating arm and attached to the operating arm such that the gripping portion is positionable proximate the elongated handle extending from the second end of the main body which is away from the operating arm, wherein the operating arm is capable of being folded to a folded position, wherein the operating arm has a first end arranged on the main body, a second end opposite to the first end, and wherein the gripping portion extends downward from the second end of the operating arm forming a generally U-shaped structure including a substantially straight grip portion and two downwardly extending side portions, wherein the distance in the vertical direction between the axial central line of the straight grip portion and the axis of the elongated handle along the length direction is less than 5 cm, wherein the distance in the horizontal direction between the axial central line of the straight gripping portion and the axis of the elongated handle along the longitude direction is less than 5 cm, and wherein the operating arm comprises an inner pipe and an outer pipe which are capable of sliding relative to each other and the outer pipe is rotatably connected to the first end of the main body, a pipe sleeve is disposed on an end of the outer pipe distal from the main body, and a safety switch assembly is mounted in the pipe sleeve, the inner pipe comprises a safety shift structure, and the safety switch assembly includes a safety switch and a trigger assembly configured to trigger the safety switch when the inner pipe is slidingly moved relative to the outer pipe such that the safety shift structure of the inner pipe is operably disengaged from the trigger assembly, and reset the safety switch when the inner pipe is slidingly moved relative to the outer pipe such that the safety shift structure operably engages the trigger assembly, and the safety switch is electrically connected to a control circuit for controlling the motor in the main body, such that the motor is inoperable when the safety shift structure of the inner pipe is operably disengaged from the trigger assembly and such that the motor is operable when the safety shift structure of the inner pipe is operably engaged with the trigger assembly.

7. The lawncare apparatus according to claim 6, wherein the elongated handle further comprises a clip, and when the operating arm is at the folded position, the clip is engaged with the straight gripping portion.

8. The lawncare apparatus according to claim 6, wherein the operating arm is extendable.

9. The lawncare apparatus according to claim 6, wherein the safety shift structure is a receiving groove configured to accommodate the trigger assembly and which is disposed on a side of the inner pipe facing the trigger assembly.

10. The lawncare apparatus according to claim 6, wherein the lawncare apparatus includes an obliquely oriented pulling position where wheels disposed at a first end of the main body are supported on a supporting surface, a vertical distance between the straight gripping portion and the supporting surface and an inclined distance between the straight gripping portion and the point at which the wheel contact the support surface has a ratio in a range from 0.5 to 1.

* * * * *